UNITED STATES PATENT OFFICE.

SAMUEL J. WILSON, OF FARMINGTON, ILLINOIS.

IMPROVEMENT IN STOVE-POLISHES.

Specification forming part of Letters Patent No. 159,056, dated January 26, 1875; application filed November 2, 1874.

*To all whom it may concern:*

Be it known that I, SAMUEL J. WILSON, of Farmington, in the county of Fulton, in the State of Illinois, have invented an Improvement in Fluid Stove-Polishes, of which the following is a specification:

This invention is among that class of stove-polishes which are composed of non-inflammable ingredients, and of a liquid form, and is compounded of powdered plumbago, sugar, vinegar, dextrine, oil of sassafras, and water, in the following proportions, viz: plumbago, one pound; vinegar, one pint; sugar, one-fourth of a pound; dextrine, one ounce; oil of sassafras, one-fourth of an ounce; water, one quart. Compounded as follows: To the dextrine add enough water to dissolve the same, and place it over the fire until it boils, then add the remainder of the water, and also the other ingredients, stirring continually until they are all well incorporated, and when this point is reached bottle up ready for use.

These ingredients are not inflammable, either by fire or by spontaneous combustion.

What I claim as my invention is—

The stove-polish composed of plumbago, vinegar, sugar, dextrine, oil of sassafras, and water, in the mode and quantities substantially as mentioned.

SAMUEL J. WILSON.

Witnesses:
JNO. W. TYLER,
A. W. RICHARD.